United States Patent

[11] 3,564,231

[72] Inventors Joe P. Bruce
Santa Ana;
Robert S. Rosenast, Newport Beach, Calif.
[21] Appl. No. 762,832
[22] Filed Sept. 26, 1968
[45] Patented Feb. 16, 1971
[73] Assignee Poly-Optics, Inc.

[54] ILLUMINATION DEVICE
8 Claims, 3 Drawing Figs.

[52] U.S. Cl. ................................................. 240/1
[51] Int. Cl. ............................................. F21v 29/00
[50] Field of Search ...................................... 240/1, 1
(ei), 6.46, 10, 41.35, 46.03, 47; 350/47, 96;
128/6—9, 23

[56] References Cited
UNITED STATES PATENTS

| | | | |
|---|---|---|---|
| 3,033,980 | 5/1962 | Pickering et al. | 240/47 |
| 3,119,567 | 1/1964 | Schwartz | 240/47 |
| 3,131,690 | 5/1964 | Innis et al. | 240/1(UX) |
| 3,180,981 | 4/1965 | Ulffers | 240/47 |
| 3,275,821 | 9/1966 | Lebb | 240/47 |
| 3,383,192 | 5/1968 | Siegmund | 350/96(X) |
| 3,423,581 | 1/1969 | Baer | 350/96(UX) |
| 3,431,410 | 3/1969 | Dolan et al. | 240/1(X) |
| 3,437,804 | 4/1969 | Schaefer et al. | 240/1(X) |
| 3,442,583 | 5/1969 | Rottmann | 350/96(X) |
| 3,455,622 | 7/1969 | Cooper | 240/1(X) |
| 1,642,187 | 9/1927 | Young | 240/1(UX) |
| 2,773,974 | 12/1956 | Markett | 240/6.46 |
| 3,299,884 | 1/1967 | Moore | 128/23 |

FOREIGN PATENTS

| | | | |
|---|---|---|---|
| 832,456 | 2/1952 | Germany | 240/1 |

Primary Examiner—John M. Horan
Assistant Examiner—Russell E. Adams, Jr.
Attorney—Nilsson & Robbins ABSTRACT: A device for holding and illuminating the bundled end of a plurality of optical fibers wherein a hollow body is provided with: a plurality of ribs at one end for securing the bundled optical fibre ends; a light bulb at the other end; a reflective inner surface surrounding the light bulb and concentrating its rays onto the fiber bundled end; a heat reflecting and light transmitting disk between the bulb and bundled end to deflect heat but transmit the concentrated light rays; and vent openings in the body.

PATENTED FEB 16 1971

3,564,231

INVENTORS
JOE P. BRUCE
ROBERT S. ROSENAST by Nilsson + Robbins
ATTORNEYS

ILLUMINATION DEVICE

BACKGROUND OF THE INVENTION

1. Field of the Invention

The fields of art to which the invention pertain includes the fields of optics and radiant energy, particularly with respect to light conducting rods such as optical fibers and decorative lights.

2. Description of the Prior Art

The advent of modern manufacturing procedures for fabricating plastic as well as glass optical fibers has made such fibers available for decorative purposes. In such utility, the fibers are often bundled together at one end with the fibers at the other end spreading out to form a bouquet of light or branches of smaller bouquets. Alternatively, individual fibers or small groups thereof can be positioned to achieve novel decorative effects.

In order to adequately illuminate the fibers, light must be concentrated onto their ends. Even with very low voltage bulbs, such concentration generates a large amount of heat. For example, concentrating the light from a 12-volt automobile headlamp bulb onto a fiber bundle about the size, in cross section, of a typical pencil, can result in temperatures in excess of 250°F. Air blowers are often required as well as expensive heat filtering lenses and a bulky structure. Another problem encountered is that of maintaining the ends of the optical fibers bundled at a predetermined point, at the focal plane of the lens or reflector utilized to concentrate the light. The bulkiness generally required, the heat generated by the light concentrating means, problems of positioning the optical fiber ends, and the like, have prevented the practical fabrication of a light source for optical fibers that can be handheld.

SUMMARY OF THE INVENTION

The present invention provides a light source for optical fibers that obviates the foregoing problems. An illumination device is provided which securely retains the ends of a plurality of optical fibers, concentrates the light from a low voltage bulb onto the fiber ends and is so constructed as to dissipate heat generated by such concentration to the extent that the device may be handheld. The construction is simple so that the device may be made economically and small enough to be handheld, yet is effective enough to concentrate a large amount of light on the fiber ends. The device provided herein comprises a housing, a light source within the housing, a light reflective surface within the housing for concentrating light from the light source to a predetermined point, and means for receiving the ends of the plurality of optical fibers at such predetermined point. Means are provided for venting the air heated during operation of the device. In particular, vent openings are provided in the housing, at least one each disposed anteriorly and posteriorly of the light source. A heat reflecting light transmitting member is disposed between the light source and the optical fiber ends, at least one vent being defined by the housing between the light source and the heat reflecting member. Air heated by the light source is deflected from the heat-reflecting member, which can be a sheet of glass or plastic, and exhausts through the vent therebetween. A flow of air is maintained between the vents anterior and posterior to the light bulb. To concentrate the light, the reflective surface is formed elliptically and advantageously constitutes the inner surface of the housing in the vicinity of the light source. As a light source one can utilize a low voltage bulb, such as a flashlight bulb or, more effectively, a 12-volt automobile headlamp. The optical fibers can have their common ends bundles together within a metal sleeve therefor which seats within a plurality of ribs on the housing receiving means to extend anteriorly of the housing and spaced therefrom. The metal sleeve serves to aid in the dissipation of heat from the optical fiber ends and the ribbed structure facilitates the air flow thereabout.

DESCRIPTION OF THE PREFERRED EMBODIMENTS

Figure 1:
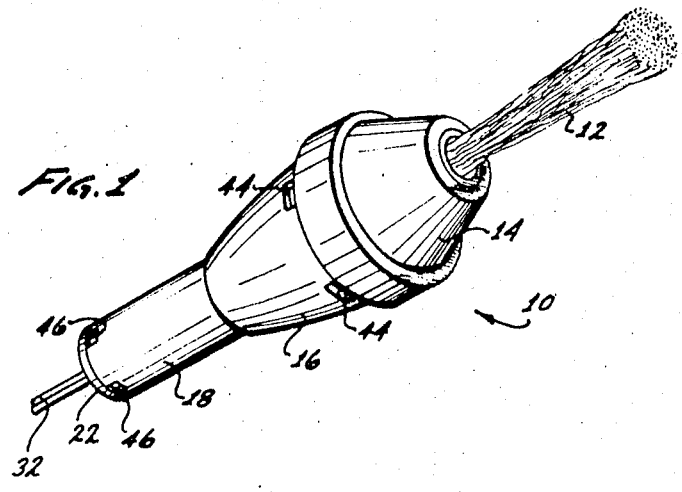
FIG. 1 is a perspective view of an illumination device of this invention with a plurality of optical fibers having their bundled ends inserted therein.
Figure 2:
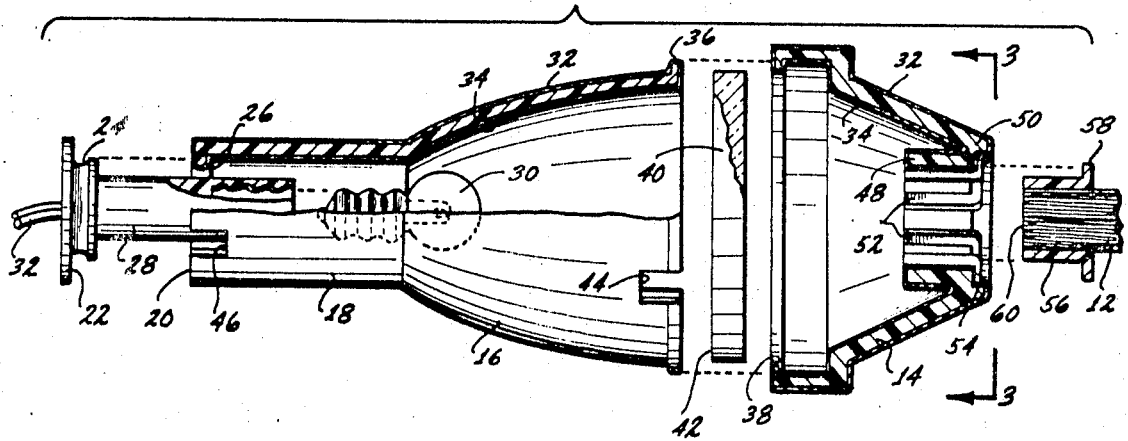
FIG. 2 is an exploded, partially cross-sectional view of the illumination device of FIG. 1.

Referring to FIGS. 1 and 2, an illumination device 10 is shown carrying at one end thereof a plurality of optical fibers 12. The illumination device 10 includes a housing having an anterior portion 14 and a posterior portion 16. The posterior portion 16 terminates in a shank portion 18 having an open end 20 into which there is snap-fitted a cap 22. The cap 22 has a flange 24 which engages a ridge 26 disposed interiorly of the shank 18 adjacent to the open end 20 thereof to effect the snap fit. The cap 22 supports forwardly thereof a socket 28 for a 12-volt bulb 30. An electrical cord 32 is operatively associated with the socket 28 and protrudes rearwardly from the cap 22. The cap 22 and socket 28 are designed so that when the cap 22 is snapped into position, the bulb 30 is positioned within the posterior portion 16 of the housing, but forwardly of the shank portion 18 thereof.

The posterior portion 16 of the housing is shaped elliptically, that is a longitudinal cross section thereof is in the form of a section of ellipse. The entire housing is coated inside and out with a highly light reflecting material 32. In this case the entire housing structure is of aluminized molded plastic. Thus, there is provided an elliptically shaped reflective inner surface 34 in the posterior portion 16, to concentrate the light at the forward point. When assembled, this point corresponds to the position of the bundled ends of the optical fibers 12, as will be more fully described below.

The forward end of the posterior housing portion 16 has an annular flange 36 thereon which fits within an annular groove 38 of the inner surface of the anterior housing portion 14 adjacent to the rearward end thereof and abuts the rear edge of the grooved material. The groove 38 is wide enough to accommodate not only the relatively narrow flange 36, but also a somewhat thicker disc 40. The disc 40 is of clear glass or plastic and is operable to pass light therethrough while reflecting heat from its rear surface 42. The disc 40 is secured within the groove 38, pressed therein by the posterior housing flange 36.

A plurality of vent openings 44, in this case four, are disposed around the flanged forward end of the posterior housing portion 16 to accommodate the rearward flow of heated air deflected by the disc 40. To further accommodate the flow of air, a plurality of vent openings 46 are formed in the rear end of the shank portion 18, adjacent to the socket cap 22. This design facilitates the flow of air, from the vents 46 and the shank portion 18 posteriorly of the light bulb 30 to the vents 44 immediately below the heat deflector 40, anteriorly of the light bulb 30.

Figure 3:
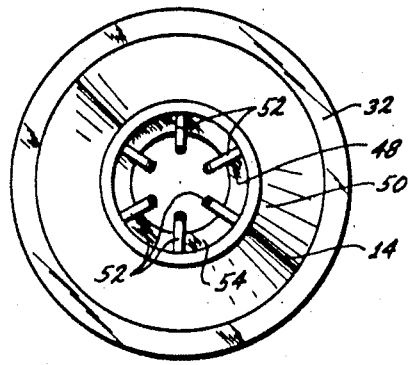
FIG. 3 is a plan view of the fibre bundle receiving end of the illumination device of FIG. 2, taken on line 3-3 thereof, in the direction of the arrows.

Referring to FIG. 3 as well as to FIG. 2, the anterior housing portion 14 includes a cylindrical member 48 suspended from the forward end 50 thereof. A plurality of ribs 52 radiate inwardly from the cylindrical member 48 to define a ribbed opening 54 in the forward end 50. The ribbed opening 54 is designed to receive the bundled ends of the plurality of optical fibers 12. The fiber ends are inserted into a metalic sleeve 56 therefor, and the sleeve 56 is frictionally secured within the ribbed opening 54. An annular shoulder 58 on the forward part of the sleeve 56 limits the extent to which the bundled fibre ends are inserted within the ribbed opening 54 and accurately aligns the light receiving end 60 thereof within the housing. The metal sleeve 56 also serves to aid in the dissipation of heat which flows outwardly through the spaces between the ribs 52.

All the foregoing components cooperate to yield a means for illuminating the optical fibers 12 that is compact, lightweight, and cool enough to be handheld indefinitely. Through the utilization of the elliptical lens, a great increase is obtained in the concentration of light directed against the optical fibers. The light-transmissive, heat-reflecting glass or plastic disc 40, air vents 44 and 46 and spaces between the ribs 52 allow sufficient ventilation and cooling of the device as to permit the utilization of such high concentrations of light in a handheld format.

We claim:

1. An illumination device comprising:
    a plurality of optical fibers, each having a light receiving end and a light emitting end;
    a housing having an open forward end;
    ventilating means comprising a plurality of ribs spacing said light receiving fiber ends inwardly of said housing forward end and at least one vent opening defined by said housing spaced rearwardly from said forward end; and
    a light source disposed at the rear end of said housing to illuminate said light receiving fiber ends.

2. The device of claim 1 including a metal sleeve bundling said light receiving fiber ends to secure said fibers together thereat, said ribs supporting said sleeve interiorly of said housing.

3. The device of claim 1 in which said housing comprises an anterior portion and a posterior portion narrowing to a terminal shank.

4. The device of claim 3 in which said anterior and said posterior housing portions are separable and said posterior portion is of integral one-piece construction including said shank.

5. The device of claim 1 including a light reflective surface on the inner walls of said housing.

6. The device of claim 5 wherein said reflective surface is integral with the inner walls of said housing.

7. The device of claim 5 wherein said reflective surface is elliptically shaped.

8. The device of claim 1 in which said light source is disposed within said housing and said housing defines at least one vent opening forwardly of said light source and at least one vent opening rearwardly of said light source.